US011366250B2

(12) United States Patent
Wu

(10) Patent No.: US 11,366,250 B2
(45) Date of Patent: Jun. 21, 2022

(54) OPTICAL DEVICE WITH SWITCHABLE MULTIPLE LENSES

(71) Applicant: Cheng-Feng Wu, Taipei (TW)

(72) Inventor: Cheng-Feng Wu, Taipei (TW)

(73) Assignee: MYNEVISKIN SP. Z O.O., Warsaw (PL)

( * ) Notice: Subject to any disclaimer, the term of this patent is extended or adjusted under 35 U.S.C. 154(b) by 407 days.

(21) Appl. No.: 16/528,815

(22) Filed: Aug. 1, 2019

(65) Prior Publication Data
US 2020/0374429 A1    Nov. 26, 2020

(30) Foreign Application Priority Data

May 21, 2019  (TW) ................... 108117575

(51) Int. Cl.
| | | |
|---|---|---|
| G02B 15/00 | (2006.01) | |
| G02B 13/00 | (2006.01) | |
| G02B 3/00 | (2006.01) | |
| G02B 7/02 | (2021.01) | |
| G02B 7/04 | (2021.01) | |
| H04N 5/225 | (2006.01) | |
| G02B 15/10 | (2006.01) | |
| H02J 7/00 | (2006.01) | |

(52) U.S. Cl.
CPC ........... *G02B 3/0075* (2013.01); *G02B 7/021* (2013.01); *G02B 7/04* (2013.01); *G02B 13/001* (2013.01); *G02B 15/10* (2013.01); *H04N 5/2254* (2013.01); *G06F 2213/0042* (2013.01); *H02J 7/00* (2013.01); *H04N 5/2256* (2013.01)

(58) Field of Classification Search
CPC .. H04N 5/2254; H04N 5/2256; G02B 3/0075; G02B 7/021; G02B 7/04; G02B 13/001; G02B 15/10; G02B 7/16; G02B 25/005; G02B 25/008; G02B 25/02; G06F 2213/0042; H02J 7/00
See application file for complete search history.

(56) References Cited

U.S. PATENT DOCUMENTS

2014/0078594 A1* 3/2014 Springer .................. G02B 7/16
359/672
2020/0304615 A1* 9/2020 Liu ....................... H04N 5/2254

FOREIGN PATENT DOCUMENTS

CN   208861128 U  *  5/2019

* cited by examiner

*Primary Examiner* — Marin Pichler

(57) ABSTRACT

An optical device with switchable multiple lenses can be mounted on an electronic device through a connecting module, and provides finely-adjusted alignment with an image capturing lens in any position, and provides a zoom or wide-angle lens for the user to change the focal length and view field of the image. A light-filling/polarizing regulation module to fill light and eliminate unnecessary reflected light to avoid marginal diminishing effect of the image. The optical device includes a viewing device, a connecting module and a light-filling/polarizing regulation module, wherein the viewing device includes a lens module located in the housing and having at least two lenses through which an image captured by the image capturing lens is magnified. At least two lenses has the same lens power, or at least two lenses of different magnifications can be used with the switchable lens seat to obtain the effects of switching different lenses.

10 Claims, 16 Drawing Sheets

OPTICAL DEVICE WITH SWITCHABLE MULTIPLE LENSES

BACKGROUND OF THE INVENTION

Field of the Invention

The invention relates to a device with multiple lenses, and more particularly to a device with multiple lenses which provides lens switching and transposition functions.

Description of the Related Art

Conventional portable electronic devices such as mart phones and tablets are limited by their appearance, volume and weight, and the thickness of the electronic devices (mobile phones, tablets). Even the shooting lenses (or image-capturing lenses) are mounted in different positions for different electronic devices. Basically, it only has a simple fixed-focus lens and cooperated with a built-in image processing technology to produce long-distance shooting. However, users are unable to perform fine-tuning of multiple magnifications as their requirement, and there are still shortcomings in wide-angle shooting and microscopy.

Although there are some add-on lens structure can be purchased on the market, the poor-designed shape makes it unable to adapt to various brands and models. Some structures are even improperly designed, which may damage electronic function or causes poor alignment of optical axis. In addition, it is mostly used only as a short-distance telephoto function, or as a low-magnification macro zoom function for ordinary photography. It cannot provide photography effect of multiple high-magnification or wide-angle, and it is unfortunate that it cannot even be regarded as a microscope which actually microscopically magnifies an object to allow its fine surface be clearly observed.

Accordingly, the inventors believe that the above-mentioned defects can be improved, and that the present invention has been put forward with great interest in designing and cooperating with scientific principles, and finally proposes a structure that reasonably and effectively improves the aforementioned defects.

BRIEF SUMMARY OF THE INVENTION

The invention provides an optical device with multiple lenses and capable of switching one lens among the multiple lenses to obtain different lens power, which effectively improve the defects of conventional magnification devices.

The optical device with switchable multiple lenses in accordance with an exemplary embodiment of the invention is configured to be mounted in front of an image-catching lens and includes a viewing device, a connecting module and a light-filling/polarizing regulation module. The viewing device includes a housing comprising at least one window; and a lens module disposed in the housing and comprising a plurality of lenses, wherein an image caught by the image-catching lens is zoomed through correspondence of any one of the lenses to the window. The connecting module on which the viewing device is mounted provides finely-adjusted alignment of the lens module with respect to the image-catching lens. The light-filling/polarizing regulation module is mounted in the housing and provides a light source and fine-tuned illumination.

The optical device with switchable multiple lenses in accordance with another exemplary embodiment of the invention is configured to be mounted in front of an image-catching lens and includes a viewing device, a connecting module and a light-filling/polarizing regulation module. The viewing device includes a housing comprising at least one window; a view operating module disposed in the housing; and a lens module disposed in the housing and comprising a plurality of lenses, wherein an image caught by the image-catching lens is zoomed through any one of the lenses switched by the related movement of the lens seat and the view operating module to correspond the window. The connecting module on which the viewing device is mounted provides finely-adjusted alignment of the lens module with respect to the image-catching lens. The light-filling/polarizing regulation modules mounted in the housing and providing a light source and fine-tuned illumination.

The optical device with switchable multiple lenses in accordance with another exemplary embodiment of the invention is configured to be mounted in front of an image-catching lens to magnify an image formed by the image-catching lens and includes a viewing device, a connecting module and a light-filling/polarizing regulation module. The viewing device includes a housing comprising a window; a view operating module disposed in the housing and comprising a rotatable wheel; and a lens module disposed in the housing and comprising a lens seat moved with the view operating module and a plurality of lenses having different lens power mounted on the lens seat, wherein an image caught by the image-catching lens is zoomed through any one of the lenses switched by the related movement of the lens seat and the view operating module to correspond the window. The connecting module on which the viewing device is mounted provides finely-adjusted alignment of the lens module with respect to the image-catching lens. The light-filling/polarizing regulation module is mounted in the housing and providing a light source and fine-tuned illumination.

In summary, the optical device with switchable multiple lenses disclosed in the embodiment of the present invention provides a structural design and arrangement relationship of the connecting module and other components (such as the viewing device and the light-filling/polarizing regulation module and light shield). The viewing device can be finely adjusted in any position (for example: a horizontal position or a vertical position) or an inclined direction through the elastic clamp when the viewing device is mounted on an electronic device 800, the view display device 1 is caused to be relative to the image by the interposer.

The optical device with switchable multiple lenses disclosed in the embodiment of the present invention provides a structure that the lens module has at least two lenses cooperated with the lens seat, and the structural configuration relationship of the connecting module, the light-filling/polarizing regulation module, and the light shield and the connecting module are respectively located in the housing. When the optical device is mounted on the electronic device and is located in front of the image capturing lens, the focal length and the field of view of the image capturing lens are changed by switching the lens, whereby multiple different magnification (or different wide-angle) for observation of the image is obtained.

The following description and drawings are of the best-contemplated mode of carrying out the invention. This description and drawings are made for the purpose of illustrating the general principles of the invention and should not be taken in a limiting sense. The scope of the invention is best determined by reference to the appended claims.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
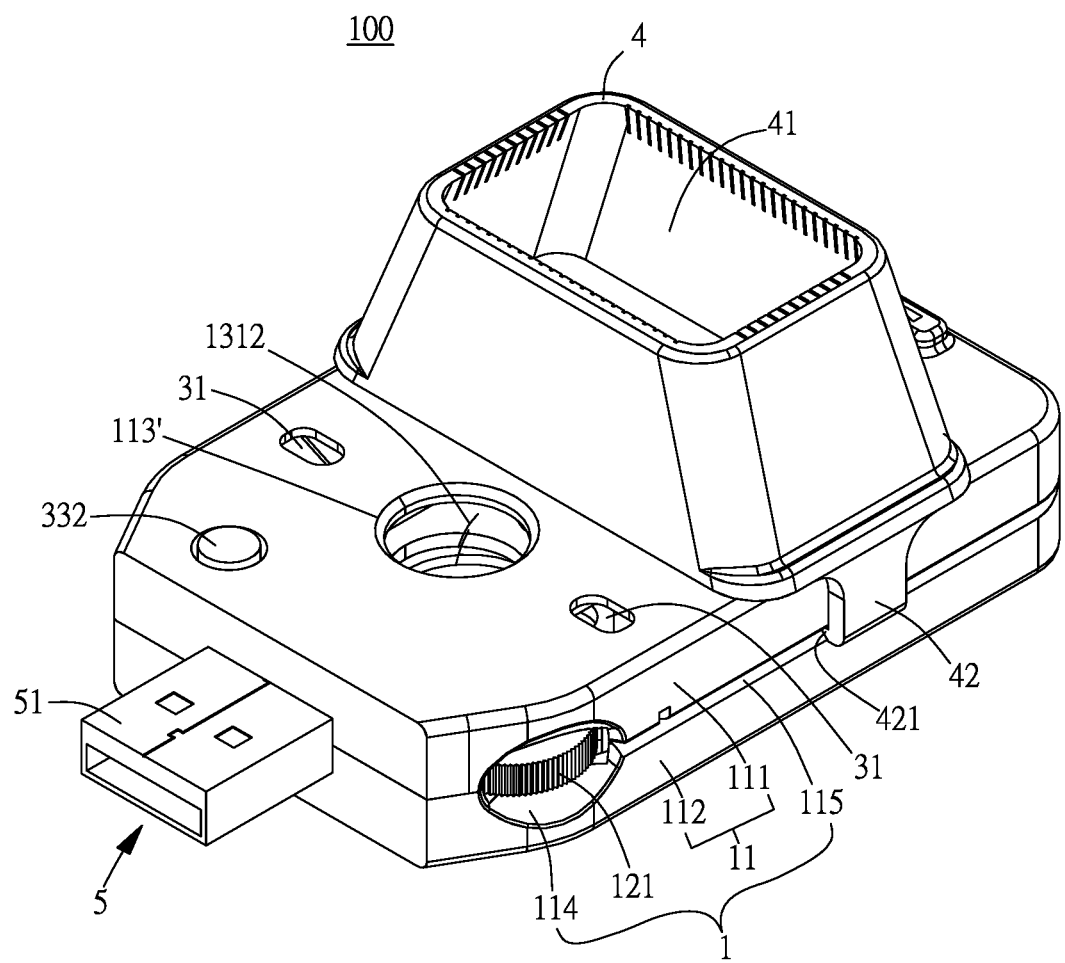
FIG. 1 is a top perspective view of an optical device with switchable multiple lenses of the present invention.

Referring to FIG. 1 to FIG. 16, which are the first embodiment and the second embodiment of the present invention. This embodiment discloses an optical device 100 (100') with switchable multiple lenses and an electronic device 800 (for example, a mobile phone, a tablet, etc.) compatible therewith. The optical device 100 can be applied to magnify an object 900 (for example, an article, a book, etc.), but the present invention is not limited thereto. It is to be noted that the amount and shape mentioned in the present embodiments corresponding to the drawings are merely to describe how the present invention is performed, and they are not to limit the scope of the present invention.

First Embodiment

Referring to FIGS. 1 to 5 and FIGS. 7 to 14, which is the first embodiment of the present invention. The present embodiment discloses an optical device 100 with switchable multiple lenses which includes a viewing device 1, a connecting module 2 configured to mount the viewing device 1 on the electronic device 800 (for example, a mobile phone or a tablet) and a light filling/polarizing regulating module 3 mounted in the viewing device 1 for filling light and eliminating unnecessary reflecting light. The optical device 100 further comprising a light shield 4 for shielding external light interference, and a charging module 5 for charging the viewing device 1, and the light filling/polarizing regulating module 3.

In the first embodiment, it is described through the viewing device 1 having at least two lenses 131 in combination with the aforementioned corresponding modules and components. However, the present invention does not limit the structural design of the connection module 2, and the light filling/polarizing regulating module 3, the light shield 4, and the charging module 5, and the connection relationship with the electronic device 800 (for example, a mobile phone, a tablet, etc.) or the object to be amplified 900 (for example, an article, a newspaper) Etc.) That is to say, in the embodiment not shown in the present invention, the viewing device 1 can also be applied separately or in combination with other modules or components.

As shown in FIGS. 1 to 8, the viewing device 1 includes a housing 11 and a lens module 13 located in the housing 11. Next, the positional relationship of the elements of the viewing device 1 will be described as follows.

Figure 2:
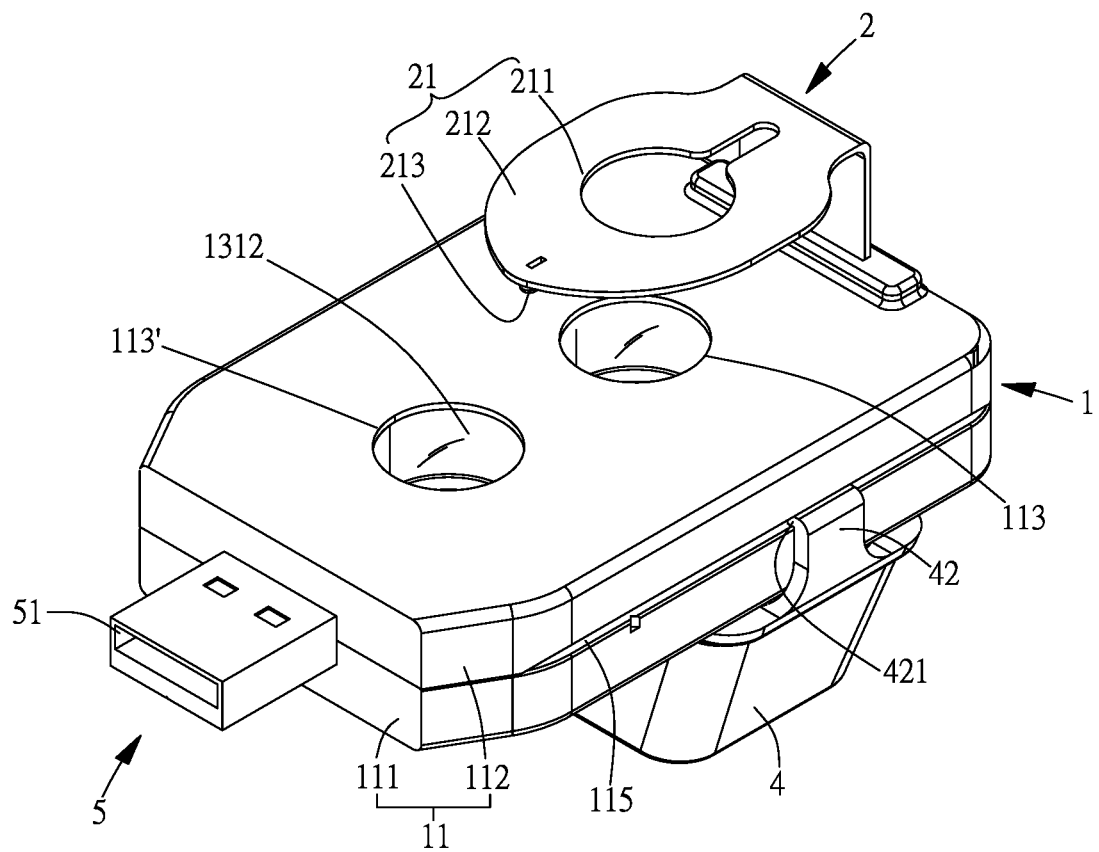
FIG. 2 is a bottom perspective view of an embodiment of a lens module having two lenses with identical lens power of FIG. 1.
Figure 3:
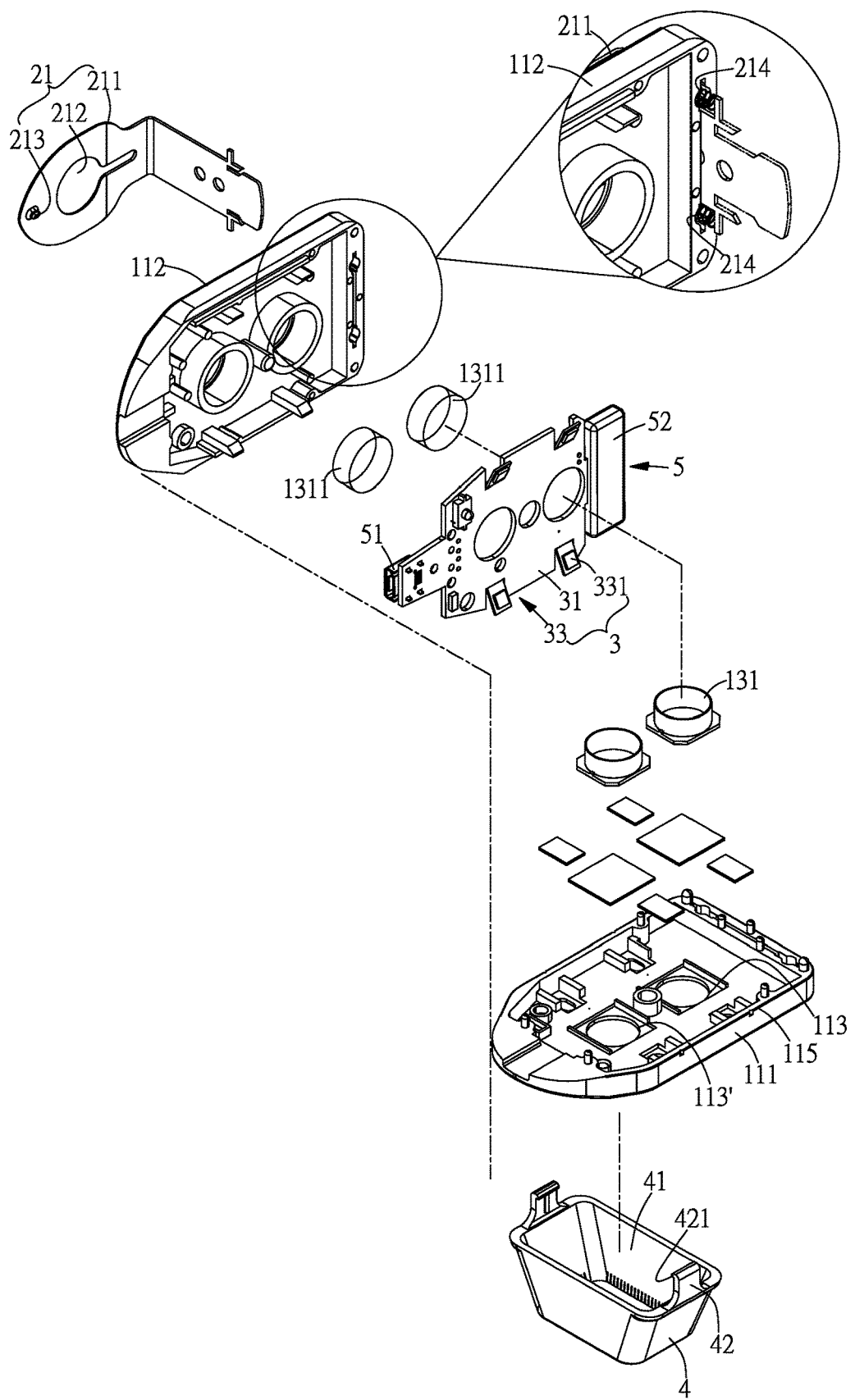
FIG. 3 is a perspective exploded view of FIG. 2.

As shown in FIGS. 2 and 3 with FIG. 1, in the first embodiment, the lens module 13 includes at least two lenses 131. The embodiment of the figure is illustrated by two lenses with "identical lens power". The following structures are only examples of the present embodiment, but the invention is not limited thereto. The housing 11 includes an upper housing 111, a lower housing 112 that can be detached from the upper housing 111, and at least one window 113 extending through the upper casing 111 and the lower casing 112. In the embodiment illustrated in FIGS. 1, 2 and 3, two windows 113 are formed on the housing 11. That is a first window 113 and a second window 113' are formed on the upper housing 111 and the lower housing 112 respectively. The housing has two rails 115 recessed on each of the opposite sides, and the rails 115 extend substantially horizontally along the side edge of the housing 11. The lens module 13 includes two lenses 131 with "identical lens power" fixed in the housing 11 and corresponding to the first window 113 and the second window 113' (or respectively corresponding to the second window 113' and the first window 113). Furthermore, the structural design of the connection module 2, the fill light and polarization control module 3, the light shield 4, and the charging module 5 of the aforementioned viewing device 1 is similar to the following structural configuration and description, the description is omitted.

When the viewing device 1 is mounted on the electronic device 800 through the connecting module 2, the image formed by the image capturing lens 801 is magnified through any one of the lenses 131 aligned with the image capturing lens 801 through window 113 (or 113'). That is the viewing device 1 is finely regulated by the connection module 2 in a horizontal position, a vertical position, or in an inclined direction with respect to the actual position of the image capture lens 801 on the electronic device 800. The light filling/polarizing regulation module 3 is mounted on the housing 11 and provides a light source and fine adjustment illumination relative to the lens module 13.

It should be noted that, in the first embodiment, the lens module 13 may also include two lenses with "different lens power"; therefore, the viewing device 1 further includes a view operating module 12 located in the housing 11, and the description of the structural design and configuration relationship of the view operating module 12 with the corresponding modules and components is as follows.

Figure 4:
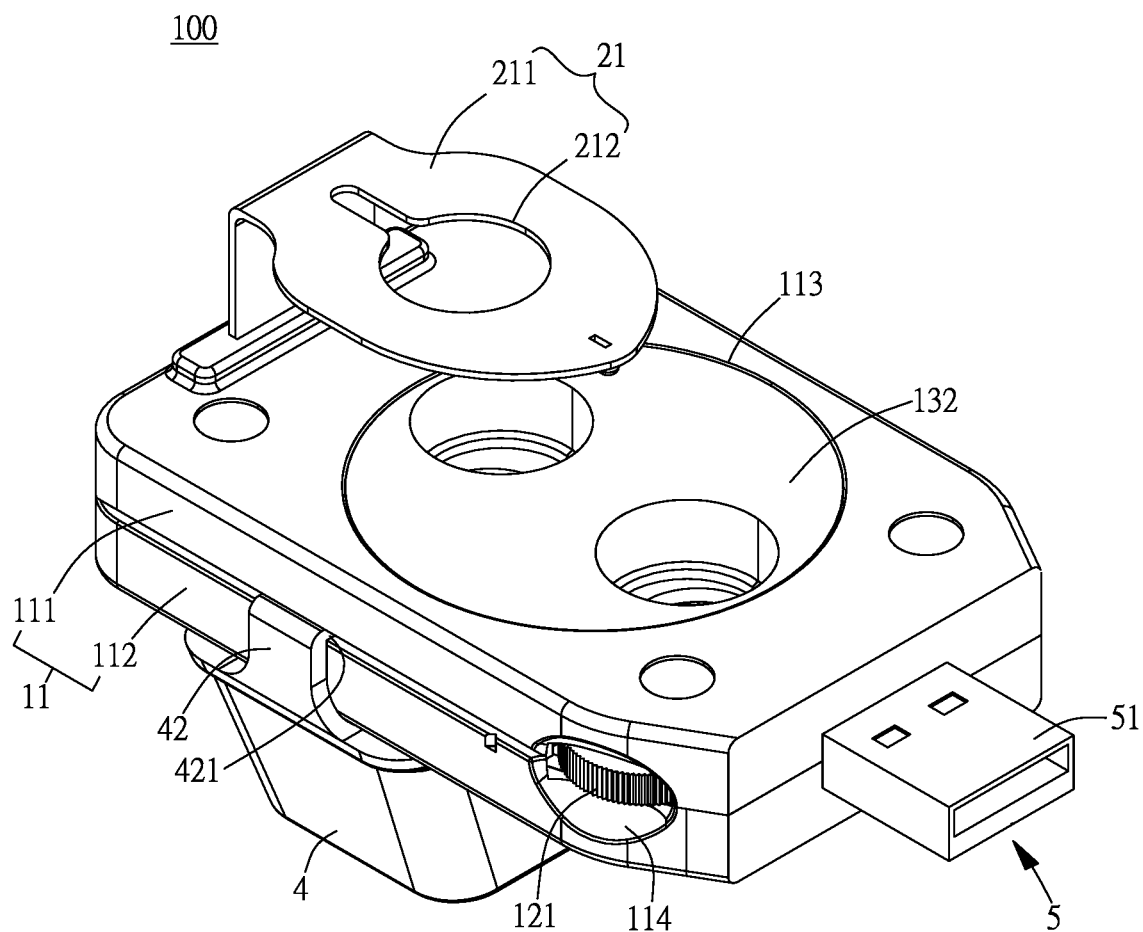
FIG. 4 is a bottom perspective view of a lens module having two lenses with different lens power of FIG. 1
Figure 5:
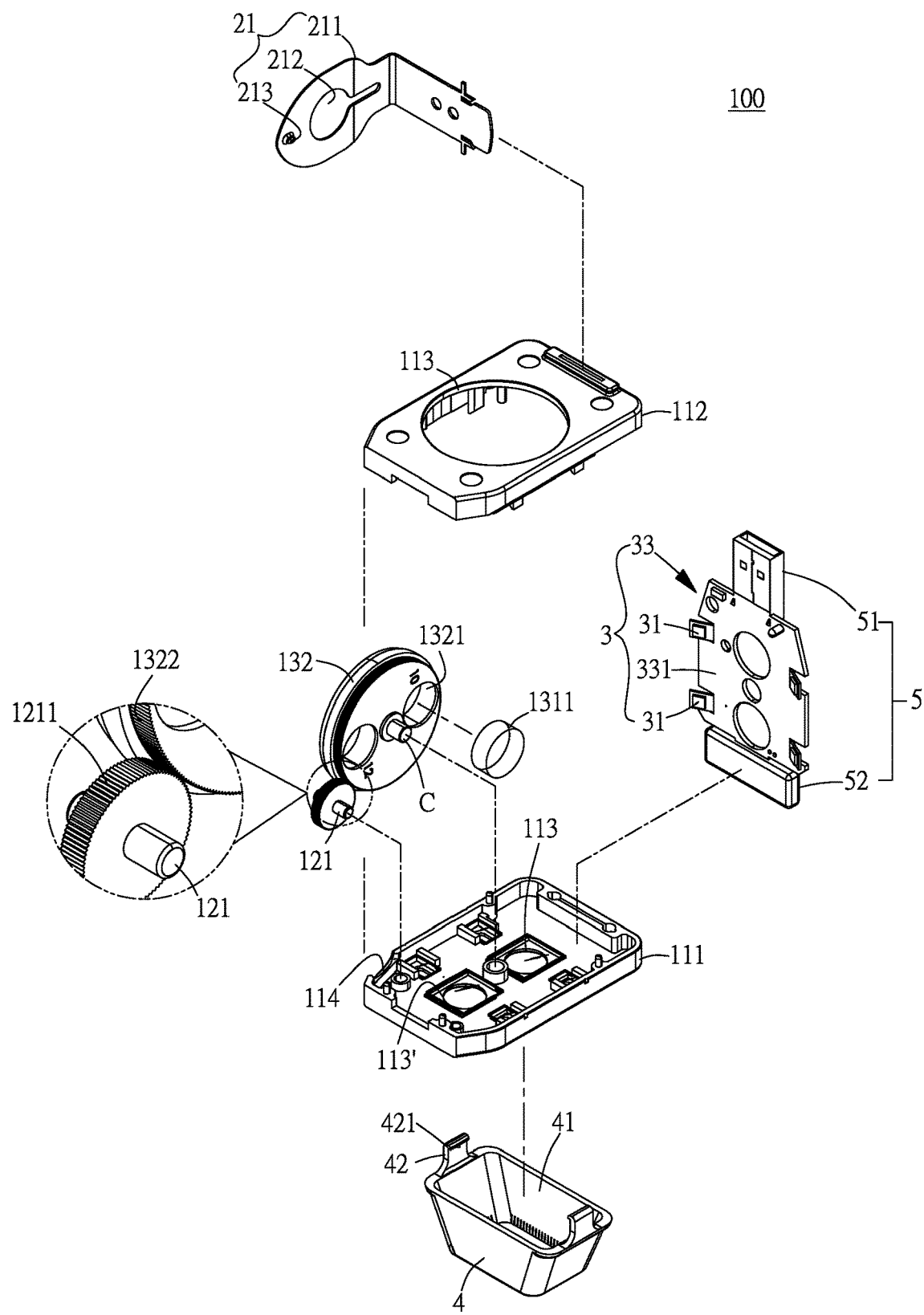
FIG. 5 is a perspective exploded view of FIG. 4.

As shown in FIGS. 4 and 5 accompany with FIG. 1, the window 113 of the housing 11 composed of the upper housing 111 and the lower housing 112 in the present embodiment includes a first window 113 and a second window 113'. A notch 114 is defined in a corner of the housing 11, and a pair of rails 115 is recessed on opposite sides of the housing 11. The view operating module 12 includes a rotational wheel 121 that is rotatably disposed on an inner surface of the lower housing 112, and the side edge of the rotational wheel 121 is provided with teeth 1211. However, the present invention is not limited to other interlocking structures of the view operating module 12.

As shown in FIG. 5, the lens module 13 and the view operating module 12 are mutually linked. Therefore, the following structures are merely illustrative, but the present invention is not limited thereto. The lens module 13 includes a lens seat 132, at least two lenses 131 having different lens power, and a multiplying adjusting interface 133. The lens seat 132 is axially disposed on the inner surface of the lower housing 112 and centered on a central axis C. The lateral edge of the lens seat 132 is provided with teeth 1322 opposite to the teeth 1211 of the rotational wheel 121, so that the lens seat 132 can be synchronously rotated about the central axis C in the housing 11 by the rotational wheel 121. At least two mounting holes 1321 are formed in the lens seat 132 with respect to the two windows 113, 113' of the housing 11.

The at least two lenses 131 having different lens power include a first lens 1311 and a second lens 1312, which are respectively fixed on the mounting holes 1321 so that an optical axis of the first lens 1311 (or the second lens 1312) is substantially perpendicular to the horizontal surface of the housing 11, and the first lens 1311 and the second lens 1312 can be switched to align with the first window 113 and the second window 113' or align with the second window 113' and the first window 113, respectively when the lens seat 132 is rotated.

The multiplying adjusting interface 133 includes a scale 1331 formed on the first lens 1311 (or the second lens 1312) with a predetermined proportional relationship corresponding to different magnification parameters for corresponding and displaying the magnification of the enlarged (or wide-angle) image in the first lens 1311 (or the second lens 1312).

Figure 11:
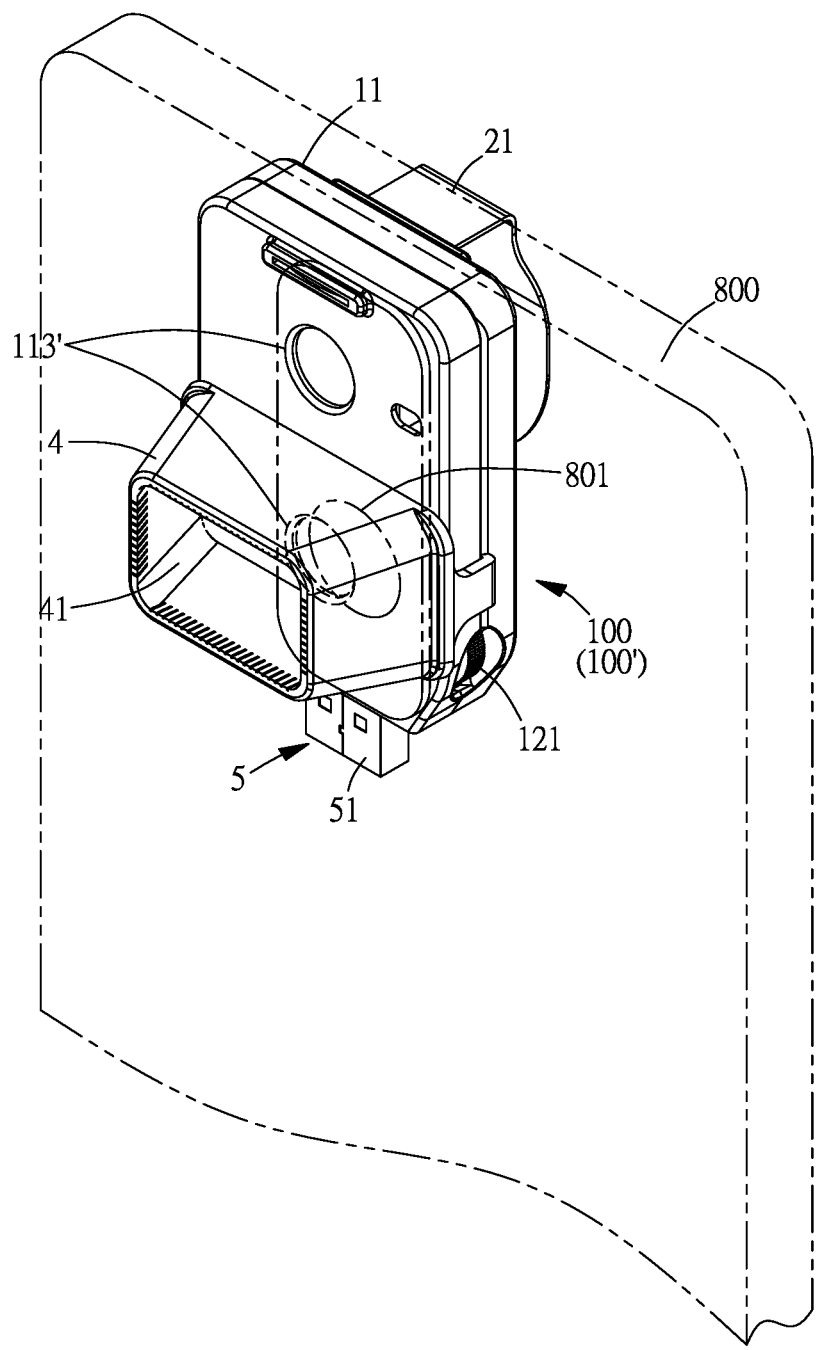
FIG. 11 is a schematic view of a light shield and a second lens aligned with the image capturing lens.
Figure 12:
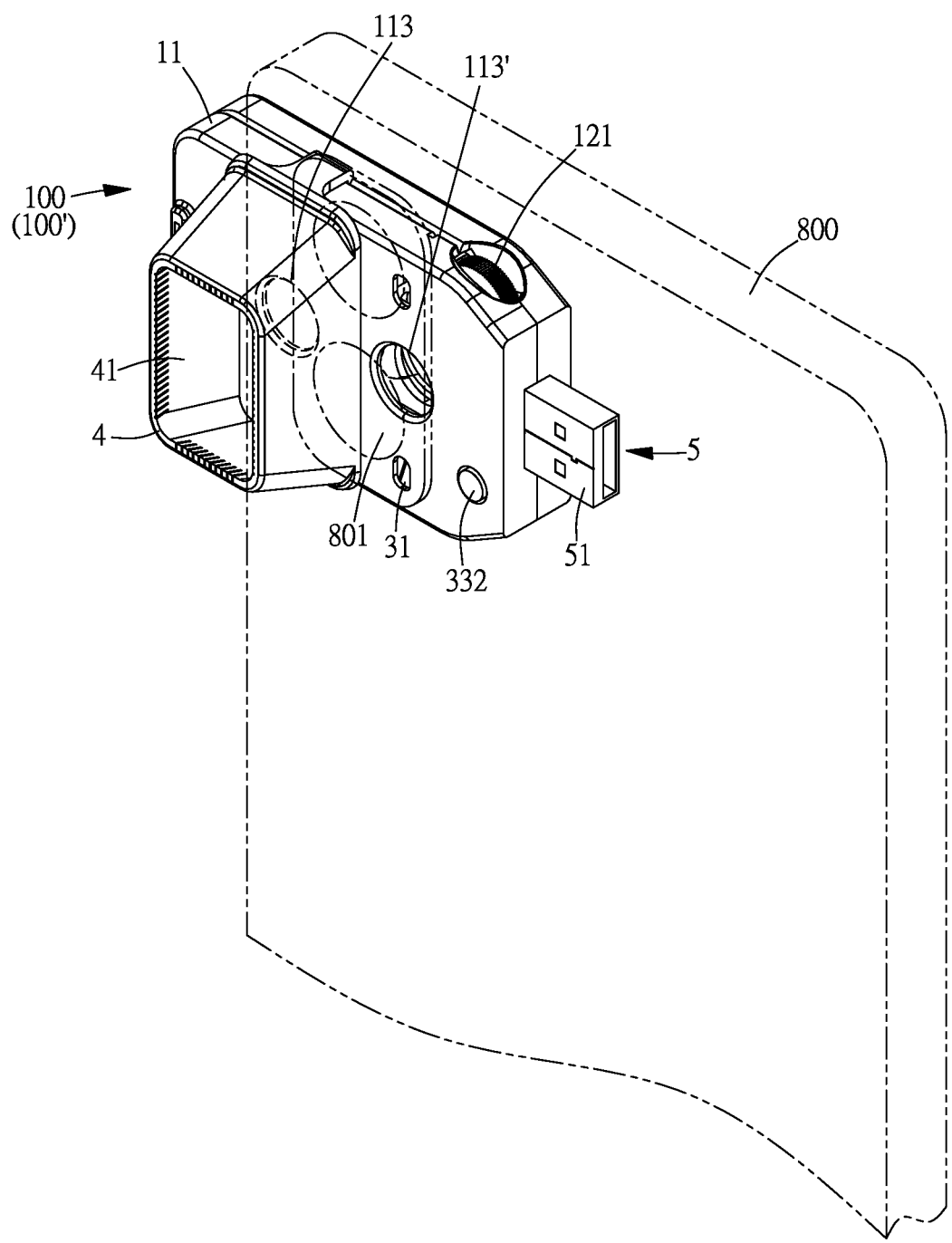
FIG. 12 is a perspective view of an embodiment of an optical device of the present invention mounted on an electronic device horizontally and aligned with an image capturing lens.
Figure 13:
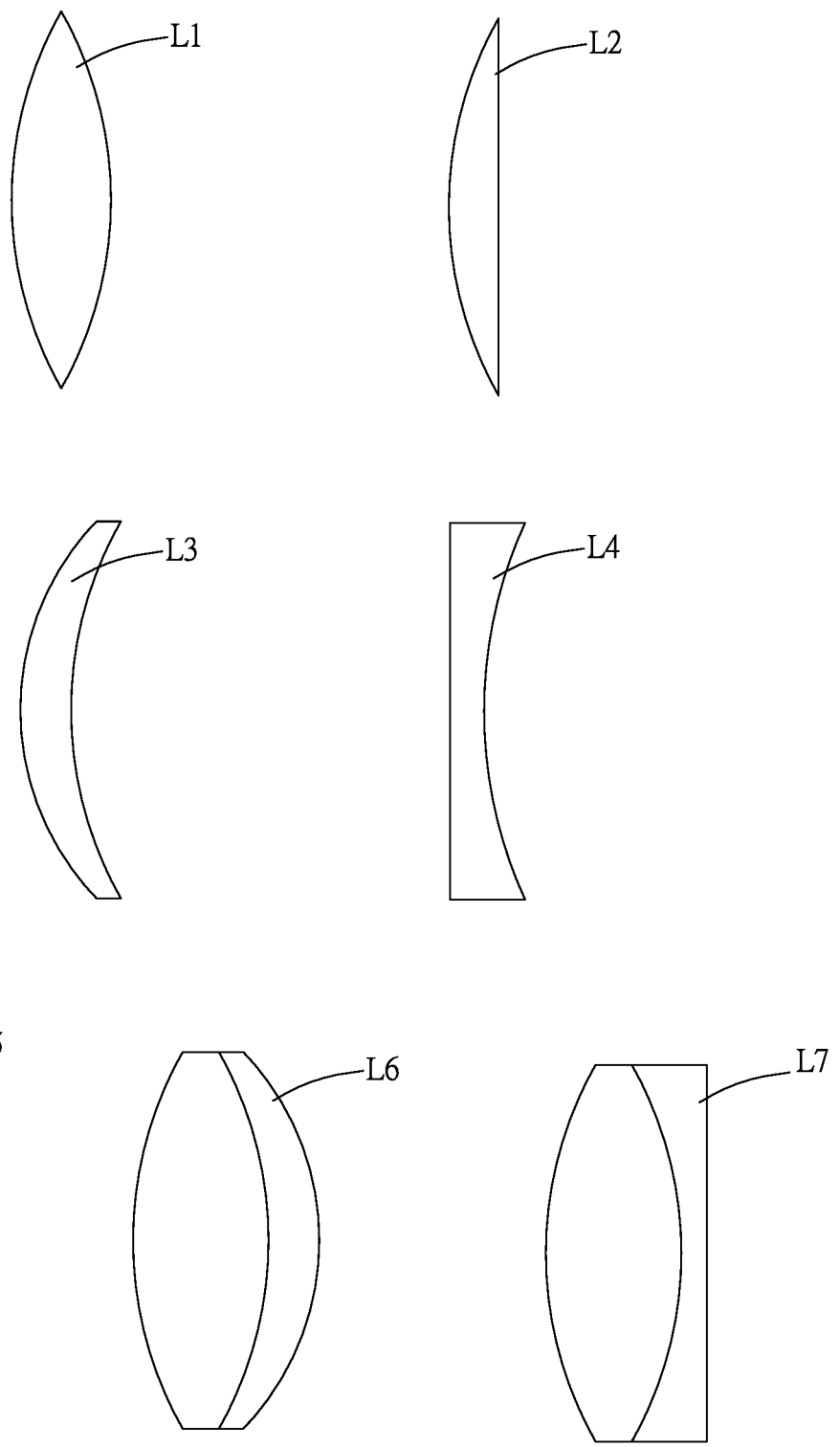
FIG. 13 is a schematic view of a lens structure of the lens module of the present invention.

Further, in the embodiment, the first lens 1311 and the second lens 1312, the components of each lens may be formed by a parallax barrier or a Lenticular. In the present embodiment, a lens is described as follows. As shown in FIG. 11, it is basically selected from the group consisting of a single lenticular lens L1, a single plano-convex lens L2, a meniscus lens L3, a single plano-concave lens L4, a single biconcave lens L5, a biconvex achromatic lens L6, and a planoconvex achromatic lens L7, which is composed of different arrangement and combination according to different practical functions. For example, a lens composed of a single plano-concave lens L4, a single biconcave lens L5, and a meniscus lens L3 can have a high-quality wide-angle shooting function. The lens composed of a single lenticular lens L1, a single plano-convex lens L2, a biconvex achromatic lens L6, and a plano-convex achromatic lens L7 can have the microscopic magnification shooting function.

Therefore, the lens seat 132 of the viewing device 1 is synchronously rotated by the rotational wheel 121 of the view operating module 12 to switch the first lens 1311 and the second lens 1312 respectively so as to align with the first window 113 and the second window 113' (or the first lens 1311 and the second lens 1312 aligned with the second window 113' and the first window 113, respectively in another embodiment), and the optical axis of any one of the lenses 1311 (or 1312) is substantially perpendicular to the image capturing lens 801 of the electronic device 800 to change the focal length and the view field of the image capturing lens 801, so as to provide switching/conversion of different magnification with the multiple lenses for image zooming (or wide-angle) effect.

As shown in FIGS. 4, 5, 6, 8 and 14, the connecting module 2 is connected to one side of the housing 11 and comprises an L-shaped elastic clamp 21, which can be made by metal material or plastic steel material, and one end of the elastic clamp 12 is connected to one end of the lower housing 112 of the housing 11. The other end of the elastic clamp 21 having a clamping sheet 211 extends substantially perpendicular to the end, parallel to the lower housing 112 and corresponding to the windows 113. The clamping sheet 211 of the sandwich body is made elastic. The clip 211 of the clip body 21 extends through a viewing window 212. The viewing window 212 is used for direct viewing to view the (or wide-angle) optical image magnified by the lens 131 in the window 113 of the housing 11.

Furthermore, a protective protrusion 213 protrudes from an inner surface of the clamping sheet 211 in the present embodiment. Therefore, when the optical device 100 is positioned in front of the image capturing lens 801 of the electronic device 800 by the clamping sheet 211 of the elastic clamp 21. That is, the viewing device 1 is regulated in any position (for example: a horizontal position, a vertical position) and an inclined direction (for example: as shown in FIGS. 9, 10, 11 and 12) with respect to the image capturing lens 801 through the elastic clamp 21. The protective protrusion 213 props against a liquid crystal panel 802 of the electronic device 800 to prevent the clamping sheet 211 from directly contacting the liquid crystal panel 802 so as to avoid scratching damage (see FIG. 15).

Figure 6:
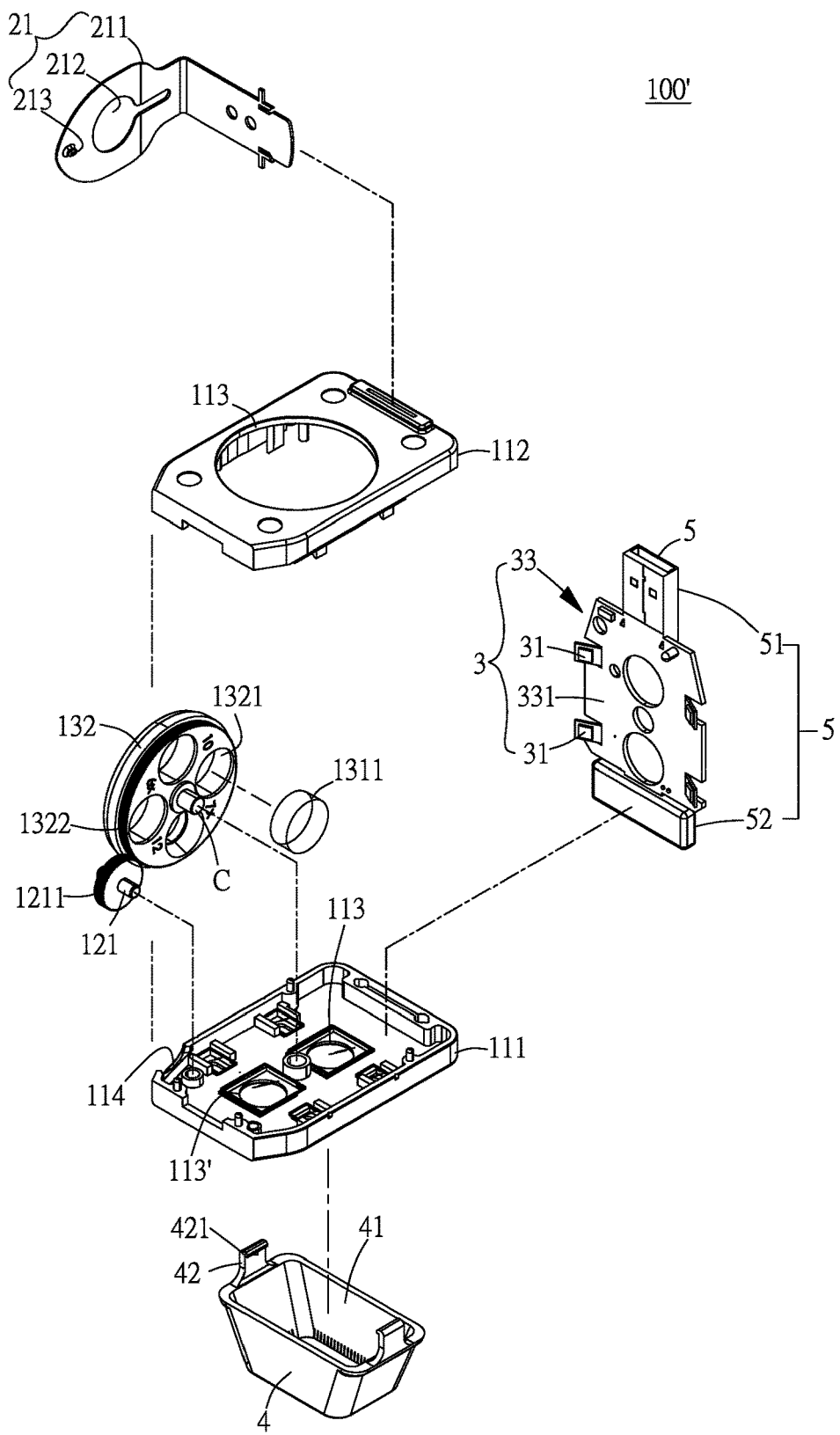
FIG. 6 is perspective exploded view of another embodiment of the lens module having four lenses with different lens power of FIG. 1.
Figure 7:
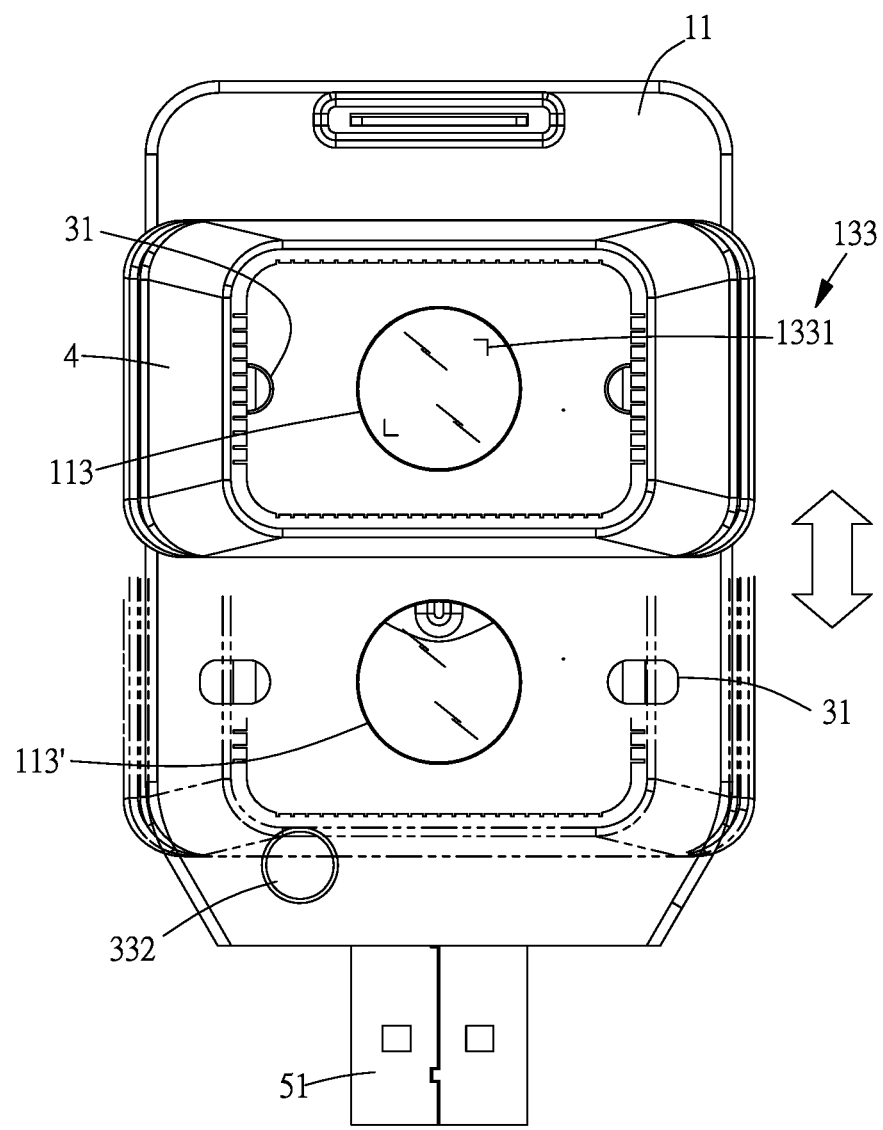
FIG. 7 depicts a light shield sliding on a housing.
Figure 8:
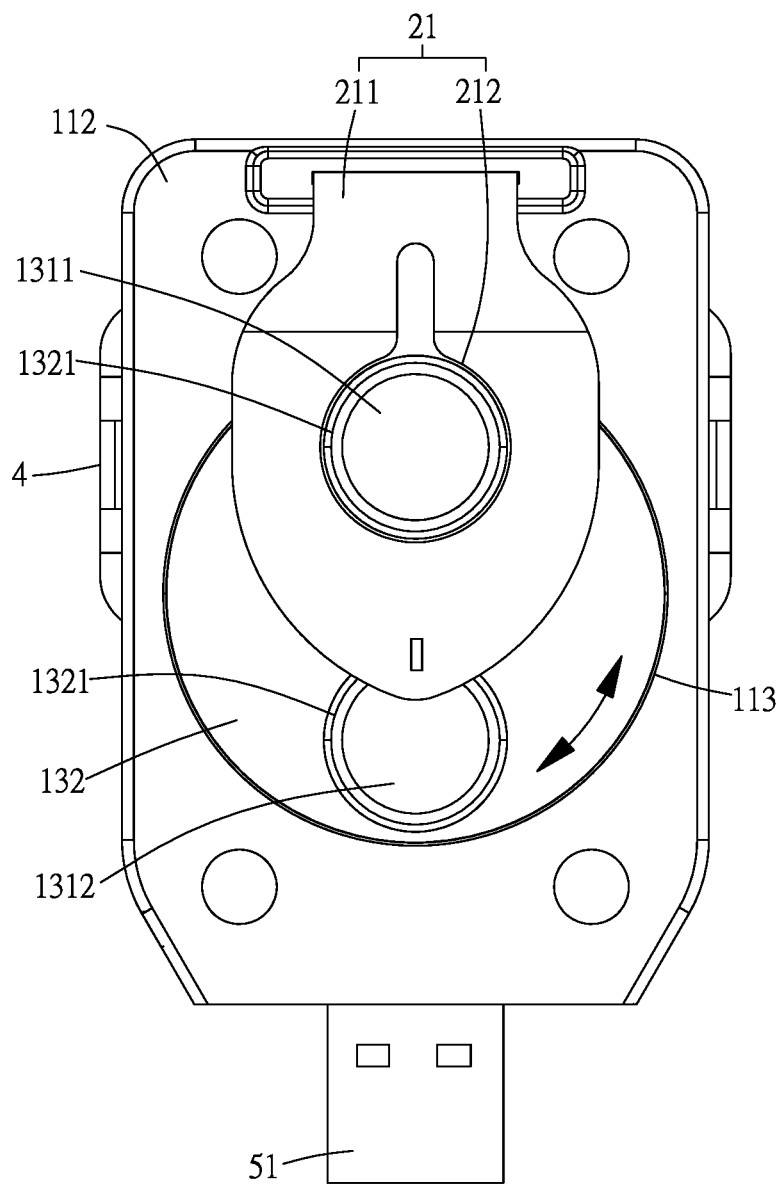
FIG. 8 is a top schematic view of FIG. 4 (including FIG. 2)
Figure 9:
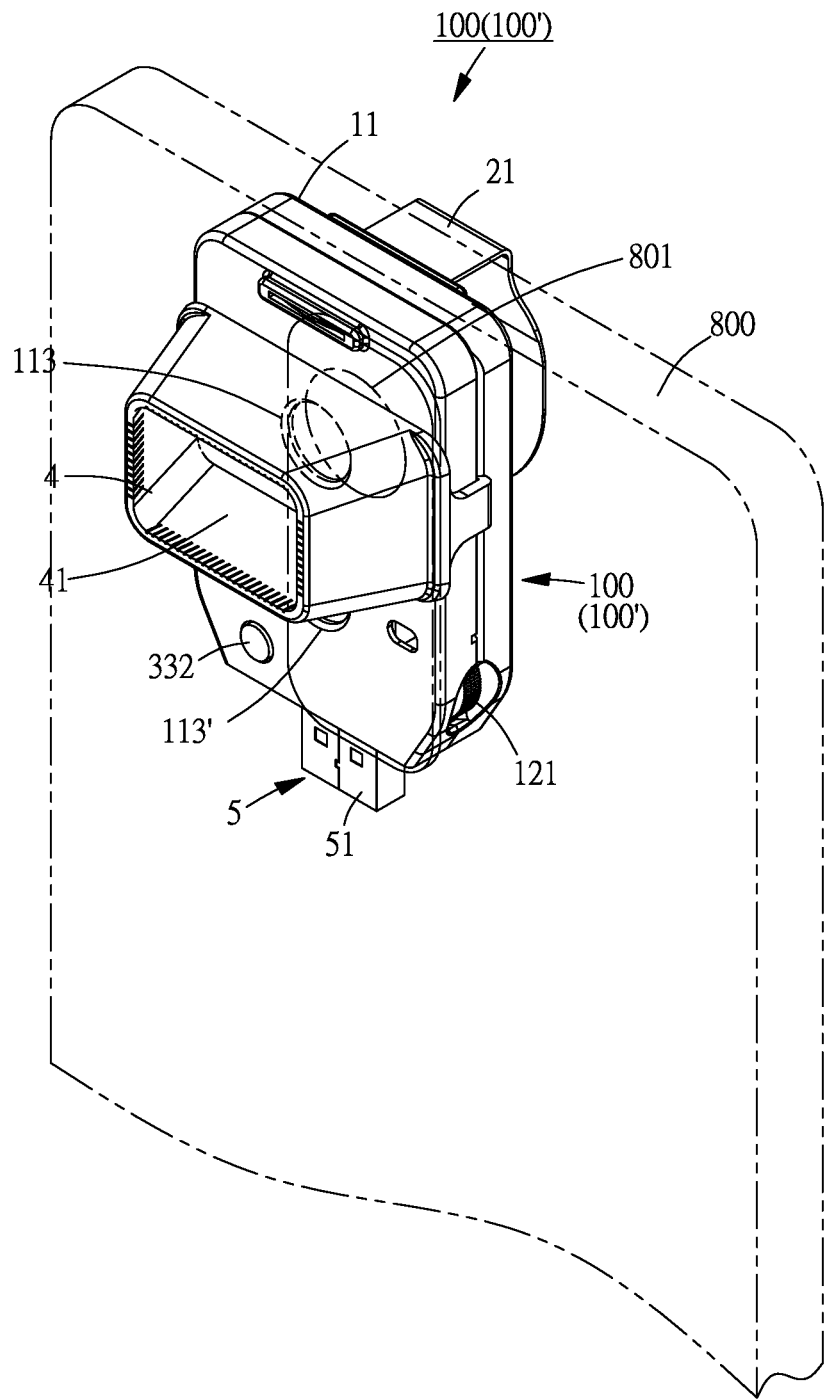
FIG. 9 is a perspective view of an embodiment of an optical device of the present invention mounted on an electronic device vertically and aligned with an image capturing lens.
Figure 10:
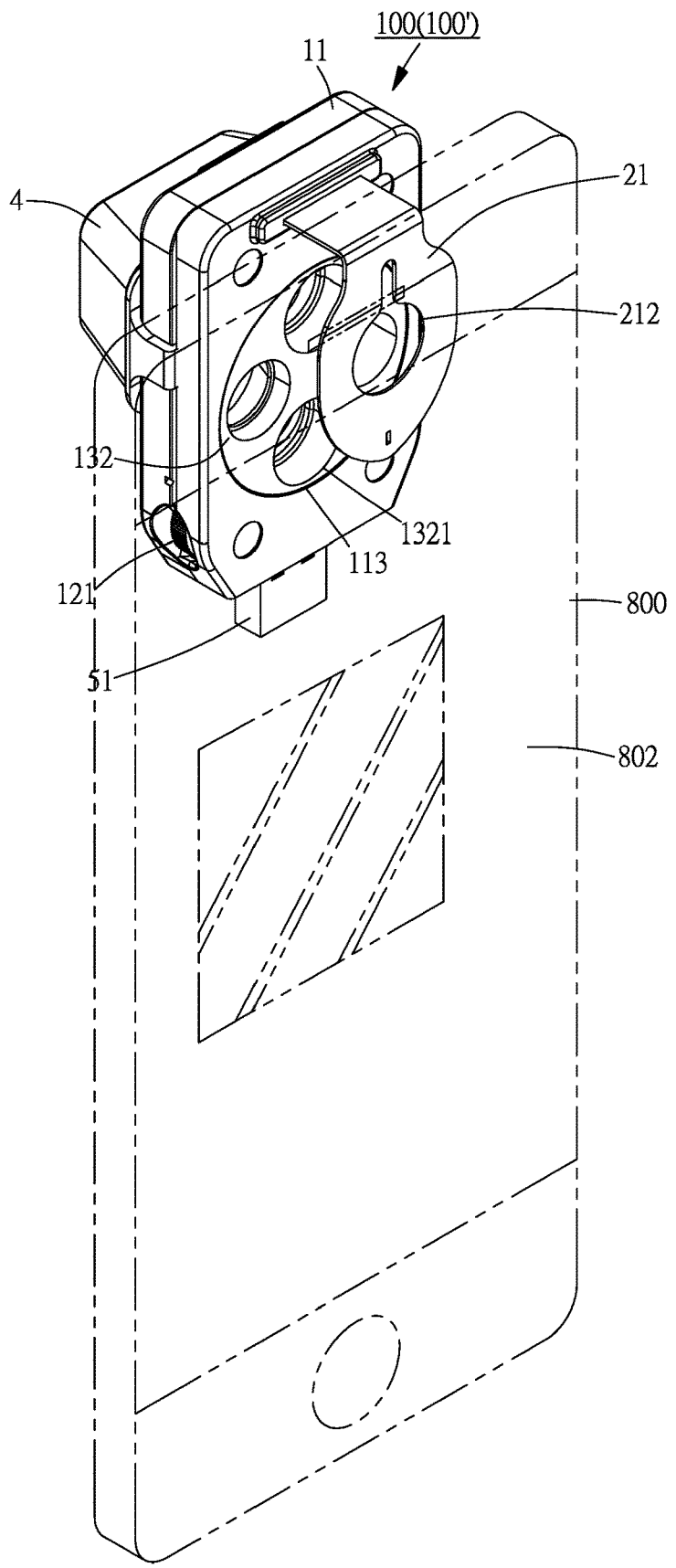
FIG. 10 is a perspective view of a first lens aligned with the image capturing lens of FIG. 9.

In more detail, as shown in FIG. 3, two springs 214 are disposed in the connection position of the L-shaped elastic clamp 21 to the lower housing 112 of the housing 11 in this embodiment, whereby the elastic clamp 21 is provided with a better elastic action of the open and rebound reset. When the clamping sheets 211 of the elastic clamp 21 are used for clamping on the electronic device 800, the springs 214 increases the elasticity of the elastic clamp 21 during the opening and returning operation, so that the housing 11 is smoothly clamped on the electronic device 800 (see FIG. 15), and vice versa the housing 11 can be removed smoothly. Similarly, the springs 214 can also be disposed in the structure of the L-shaped elastic clamp 21 of the connecting module 2 as shown in FIGS. 5 and 6.

As shown in FIGS. 1 and 5, the light-filling/polarizing regulation module 3 is mounted on the housing 11 and controls the lens module 13 to provide a complementary light and a polarizing function. The light-filling/polarizing regulation module 3 includes at least two sets of light emitting diodes (LED) 31 to provide sufficient illumination for each of the lenses 131, at least two sets of polarizers (not shown) for polarizing the light from the LEDs 31, and a control module 33 configured to electrically control the LEDs 31 and the polarizers. In the present embodiment, the at least two sets of LEDs 31 and the at least two sets of polarizers correspond to the two lenses 131 of the lens module 13 (including the first lens 1311 and the second lens 1312), and therefore they are described in two groups.

Hereinafter, the interconnection relationship between the components of light-filling/polarizing regulation module 3 will be described.

The two sets of LED illuminations 31 are located at predetermined holes of the upper case 111 of the housing 11 and respectively correspond to the positions of the first lens 1311 and the second lens 1312 of the lens module 13, and each set of the LEDs 31 includes two LED lamps (not shown in the figure), and the two LED lamps are respectively located on opposite sides of the upper housing 111 corresponding to the first lens 1311 (or the second lens 1312), and can provide even illumination for the first lens 1311 (or the second lens 1312). The two sets of polarizers (not shown) are respectively adjacent to the two sets of LED illumination 31, and each set of polarizers includes two polarizers (not shown) corresponding to two LED lamps of each LED set 31 (examples are shown in FIGS. 1, 5 and 6). The control module 33 is located in the housing 11 and includes a control circuit 331 electrically connected to the LEDs 31 and the polarizers. The control circuit 331 is electrically connected to the lens module 13 of the viewing device 1 and to a touch switch 332 electrically connected to the control circuit 331 (example is shown in FIG. 1).

Furthermore, when the lens module 13 is switched to enable the first lens 1311 (or the second lens 1312) at any magnification, the touch switch 332 can turn on the two LED lamps and the two polarizers corresponding to the first lens 1311 (or the second lens 1312) to provide sufficient light illumination and convert the light generated by the LED lamps into polarized light, thereby eliminating unnecessary reflected light generated by the LED lamps. The marginal diminishing effect of the image caused by the magnification (or wide angle) of the image formed by the first lens 1311 (or the second lens 1312) is prevented, and the glare preventing effect is enhanced to make the enlarged (or wide-angle) image clearer. Moreover, the user can adjust the brightness value of the LED light source by pressing the touch switch 332 for a longer period, thereby providing the first lens 1311 (or the second lens 1312) with finely adjusted illumination of the light source and the polarized light, More in line with the user's actual use.

In more detail, the touch switch 332 can be a touch button disposed on the housing 11 to allow the user to turn on in a predetermined manner and use the required finely adjusted illumination in the present embodiment. However, the invention is not limited.

As shown in FIGS. 1 to 7, the light shield 4 is surrounded by a cover wall to form a hollow cover body, which includes a window hole 41 extending through the hollow cover body and two sliding portions 42 protruding from opposite sides of the bottom of the light shield 4 respectively. The cover wall of the light shield 4 is a substantially trapezoidal body having a top diameter smaller than the bottom diameter. The window hole 41 is a through hole extending from the top to the bottom, and the sliding portion 42 extends from the free end edge to the inner surface and has a hook 421, whereby the light shield 4 can substantially cover the upper housing 111 of the housing 11 horizontally with the bottom of the light shield 4 with the hook 421 of the sliding portion 42 engaging with the rail 115 of the side edge of the housing 11. The light shield 4 can be relatively horizontally slid on the upper housing 111, and the window hole 41 of the light shield 4 can be completely correspond to the first window 113 (or the second window 113') of the upper housing 111. (FIG. 7) for effectively preventing the external light source from interfering the image formation of the first lens 1311 (or the second lens 1312) in the first window 113 (or the second window 113'). Moreover, the light shield 4 and the connecting module 2 are respectively located on different sides of the housing 11 (i.e. located outside the upper housing 111 and the lower housing 112 respectively). However, the present invention does not limit other functional structures of the light shield 4.

As shown in FIGS. 1, 2 and 4, the charging module 5 is configured as described below with the corresponding modules and components in the embodiment, but the present invention does not limit the structural design of the charging module 5 and its connection relationship with the viewing device 1 and the light-filling/polarizing regulation module 3. The charging module 5 includes a rechargeable battery 52 disposed in the housing 11 and a USB plug 51 protruding from the outside of the housing 11. The USB plug 51 is electrically connected to the rechargeable battery 52 and the USB plug 51 is electrically connected to the lens module 13 of the viewing device 1 and the light-filling/polarizing regulation module 3 to provide power for facilitating the operation of the modules.

According to the above, the light shield 4 and the connecting module 2 of the present embodiment are respectively located in the upper housing 111 and the lower housing 112 of the housing 11 (i.e. on the different sides of the housing 11 respectively). The lens module 13 of the viewing device 1 and the view operating module 12 are in a mutually linked structure. When the user controls the wheel 121 to rotate the lens seat 132 synchronously, the first lens 1311 and the second lens 1312 are switched corresponding to the first window 113 and the second window 113' (or the first lens 1311 and the second lens 1312 corresponding to the second window 113' and the first window 113, respectively in another embodiment).

Therefore, when the optical device 100 is externally mounted on the electronic device 800 through the clamping sheet 211 of the elastic clamp 21, the optical device 100 is finely adjusted in a horizontal position, in a vertical position and in an inclined direction with respect to the image capturing lens 801 of the electronic device 800 (examples are shown in FIGS. 9 to 12). The viewing device 1 is mounted and placed in front of the image capturing lens 801, the optical axis of the first lens 1311 (or the second lens 1312) of the lens module 13 is perpendicular to the image capturing lens 801 of the electronic device 800, and the light shield 4 horizontally slides on the upper housing 111, and the window hole 41 of the light shield 4 completely covers the first window 113 (or the second window 113') of the upper housing 111 to effectively prevent the external light source from interfering the image formation of the first lens 1311 in the first window 113 (or the second lens 1312 in the second window 113') exhibits an enlarged (or wide-angle) optical image function.

Furthermore, the touch switch 332 can turn on two LED lamps and two polarizers relative to the first lens 1311 (or the second lens 1312) to provide sufficient light illumination, and the light from the LED lamps is converted into polarized light to eliminate unnecessary reflected light generated by the LED lamp, thereby preventing the diminishing marginal utility of the image formed by the first lens 1311 (or the second lens 1312) caused by magnification (or wide-angle), and also preventing glare effect is made, so that the magnified (or wide-angle) image is softer. Moreover, the user can adjust the brightness value of the LED light source by pressing the touch switch 332 for a long period, thereby providing the first lens 1311 (or the second lens 1312) with finely-adjusted illumination of the light source and the polarized light.

Figure 14:
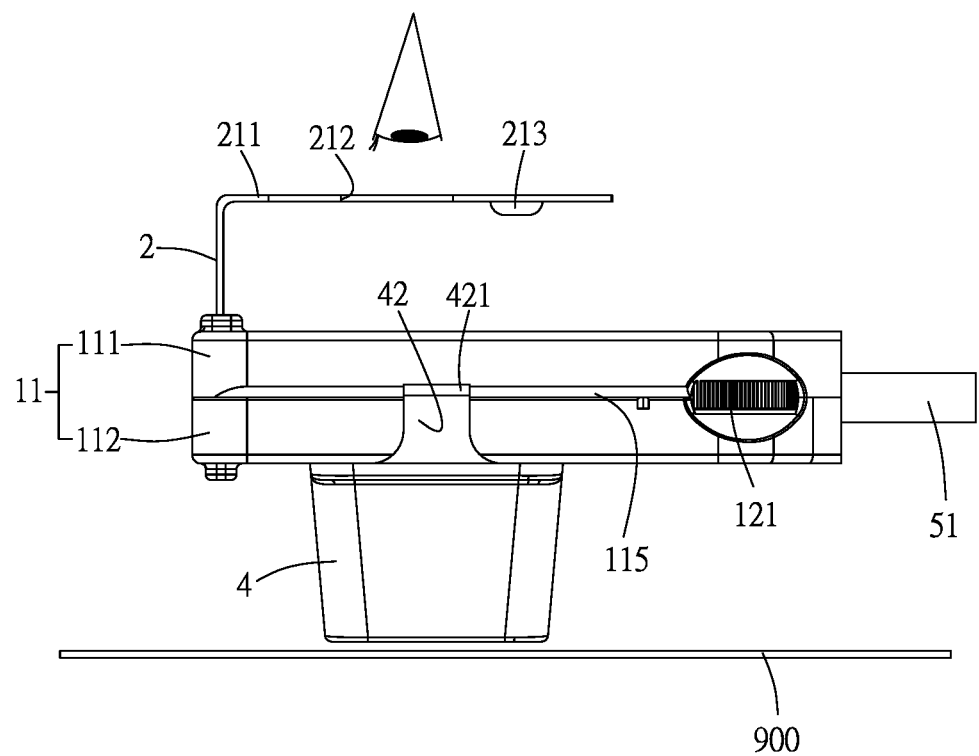
FIG. 14 is a schematic view of an optical device of the present invention applied for observation of an object.
Figure 15:
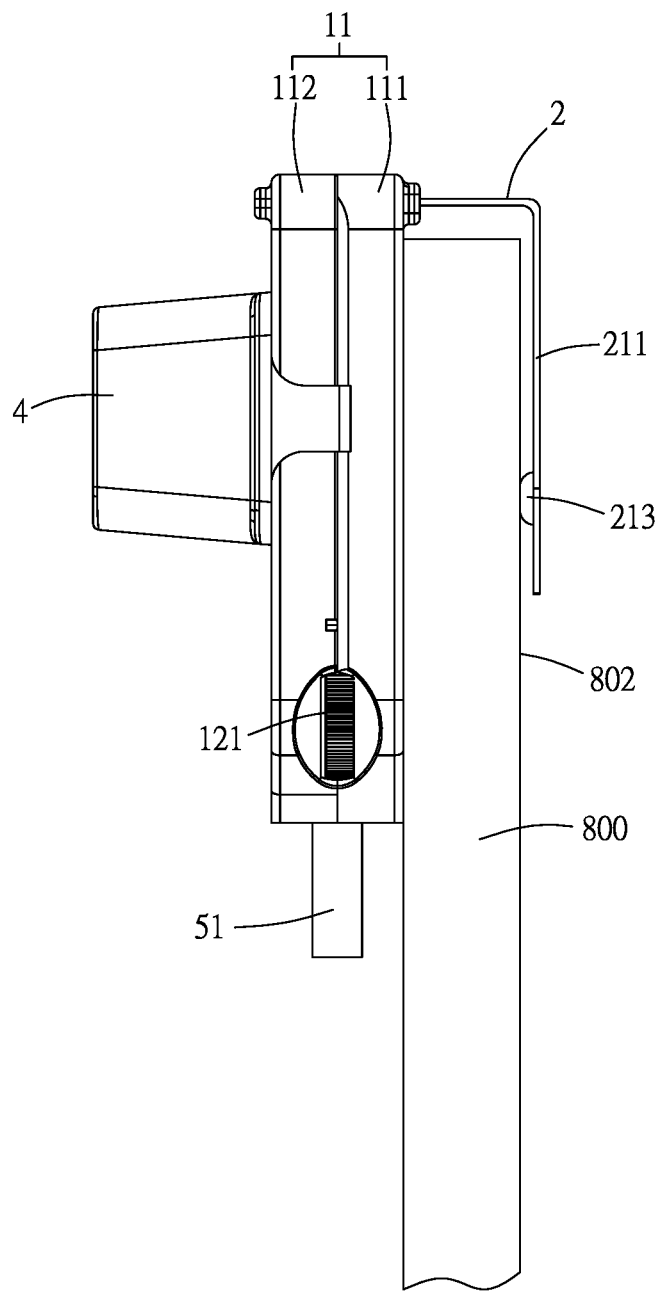
FIG. 15 is a schematic view of a protective protrusion of a clamping sheet propping against a liquid crystal panel of an electronic device.
Figure 16:
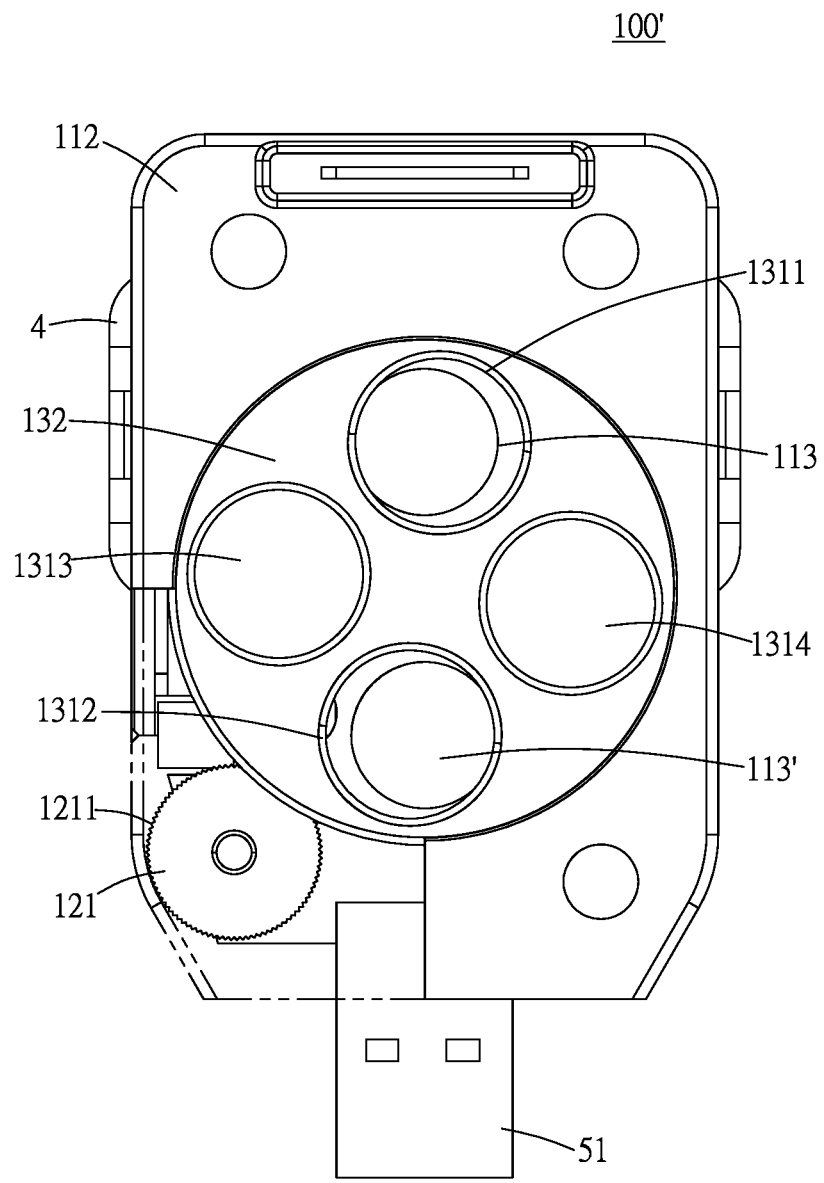
FIG. 16 is a top perspective view of another embodiment of a lens module of an optical device with switchable multiple lenses of the present invention (having four lenses with different lens power).

In this embodiment, as shown in FIG. 14, a viewing window 212 is formed on the clamping sheet 211 of the elastic clamp 21 of the connecting module 2, and when the optical device 100 is directly covered by the window hole 41 of the light shield 4 and corresponds to the object 900 to be magnified, the viewing window 212 can be used to directly view the image formed by the first lens 1311 (or the second lens 1312) in the window 112 of the housing 11.

Second Embodiment

Referring to FIGS. 1, 6, 8 and 16, which is a second embodiment of the present invention, the second embodiment is similar to the first embodiment, and the same element and structure are not described herein. The difference between the second embodiment and the first embodiment described above is as follows.

In the second embodiment, the lens seat 132 of the lens module 13 of the optical device 100' is pivoted in the housing 11 with respect to a central axis C, and a plurality of mounting holes 1321 are disposed on the lens seat 132 and four mounting holes 1321 are present as an example for description in the second embodiment, but the invention is not limited thereto. Four lenses 131 are also presented as an example for description. That is, the four lenses 131 include a first lens 1311, a second lens 1312, a third lens 1313, and a fourth lens 1314 having different lens power. The four lenses 131 are divided into two pairs (for example, the first lens 1311 and the second lens 1312 constitute a pair A, and the third lens 1313 and the fourth lens 1314 constitute a pair B), and the pairs A and B are formed together, centered about the central axis C and arranged in a crosswise manner on the lens seat 132 such that the optical axes of the lenses 131 (the first lens 1311, the second lens 1312, the third lens 1313, and the fourth lens 1314) are substantially perpendicular to a plane of the image capturing lens 801. Each of the four lenses 131 of the second embodiment is the same as the lens elements of the first embodiment, and may have different arrangement according to different practical functions (as shown in FIG. 11). Therefore, the description is omitted.

The multiplying adjusting interface 133 includes a scale 1331 formed on the first lens 1311 (or the second lens 1312, the third lens 1313, and the fourth lens 1314) with a predetermined proportional relationship corresponding to different magnification parameters for corresponding and displaying the magnification of the enlarged (or a wide angle) image in the first lens 1311 (or the second lens 1312).

According to the above, in the second embodiment, the user can control the rotation of the rotational wheel 121 to rotate the lens holder 132 synchronously, thereby switching the first lens 1311 and the second lens 1312 of the pair A respectively in alignment with the first window 113 and the second window 113' in a first aspect, or with the second window 113' and the first window 113, respectively in a second aspect. Alternatively, the lens seat 132 is further rotated to switch the third lens 1313 and the fourth lens 1314 of the pair B, respectively in alignment with the first window 113 and the second window 113' respectively in a third aspect, or with the second window 113' and the first window 113, respectively in a fourth aspect. In other words, the lens seat 132 is rotated once by the rotating wheel 121 of the view operating module 12, the two lenses 131 of the lens seat 132 are aligned with the two windows 112, whereby the multiple lenses are switched to obtain desired magnification for the image.

Thereby, the light shield 4 and the connecting module 2 are respectively located in the upper housing 111 and the lower housing 112 of the housing 11 (i.e. the positional relationship on the different sides of the housing 11 respectively), when the optical device 100' is externally mounted on the electronic device 800 through the clamping sheet 211 of the elastic clamp 21. An effective shading effect is provided for the magnified (or wide-angle) optical image formed by the selected lens through a structure that the viewing device 1 is located in front of the image capturing lens 801 (for example, FIGS. 9 to 12), the lens seat is rotated by the wheel 121 to make the optical axis of the first lens 1311 (or the second lens 1312, the third lens 1313, and the fourth lens 1314) at any magnification of the lens module 13 with respect to the first window 113 (or The second window 113') substantially perpendicular to the image capturing lens 801, and then completely covers the first window 113 of the upper housing 111 through the window hole 41 of the light shield 4 (or the second window 113).').

Technical Effect of the Embodiments of the Present Invention

In summary, the optical device 100 (or 100') with switchable multiple lenses disclosed in the embodiment of the present invention provides a structural design and arrangement relationship of the connecting module 2 and other components (such as the viewing device 1 and the light-filling/polarizing regulation module 3 and light shield 4). The viewing device 1 can be finely adjusted in any position (for example: a horizontal position or a vertical position) or an inclined direction through the elastic clamp 21 when the viewing device 1 is mounted on an electronic device 800, the view display device 1 is caused to be relative to the image by the interposer 21.

The optical device 100 (or 100') with switchable multiple lenses disclosed in the embodiment of the present invention provides a structure that the lens module 13 has at least two lenses 131 (including two lenses of different lens power, or four lenses of different lens power) cooperated with the lens seat 132, and the structural configuration relationship of the connecting module 2, the light-filling/polarizing regulation module 3, and the light shield 4 and the connecting module 2 are respectively located in the housing 11. When the optical device 100 (or 100') is mounted on the electronic device 800 and is located in front of the image capturing lens 801, the focal length and the field of view of the image capturing lens are changed by switching the lens 131, whereby multiple different magnification (or different wide-angle) for observation of the image is obtained.

Furthermore, the lens module 13 has the structure of the lens holder 132 capable of switching four lens 131 of different lens power, so that the user can select the lenses of different lens power. The touch switch 332 can turn on at least two sets of LEDs 31 and at least two sets of polarizers of the light-filling/polarizing regulation module 3 to provide sufficient illumination for the lenses 131, and polarize the light from the LEDs to eliminate unnecessary reflected light. The marginal diminishing effect of the image caused by magnification of the lenses 131 is avoided, so that the enlarged (or wide-angle) image is more clear, so as to greatly improve the practical use effect.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device with switchable multiple lenses, configured to be mounted in front of an image-catching lens, comprising:
 a viewing device comprising:
  a housing comprising at least one window; and
  a lens module disposed in the housing and comprising a plurality of lenses,
 wherein an image caught by the image-catching lens is zoomed through correspondence of any one of the lenses to the window;
 a connecting module on which the viewing device is mounted providing finely-adjusted alignment of the lens module with respect to the image-catching lens; and
 a light-filling/polarizing regulation module mounted in the housing and providing a light source and fine-tuned illumination,
 wherein the light-filling/polarizing regulation module comprises at least two sets of light emitting diodes serving as a light source for each of the lenses and at least two sets of polarizers polarizing light from the light emitting diodes to prevent marginal diminishing effect and dazzling.

2. The optical device as claimed in claim 1, wherein the lens module of the viewing device further comprises a multiplying adjusting interface comprising a scale disposed on the lenses corresponding to a size of an image formed by the lenses.

3. The optical device as claimed in claim 1, wherein the connecting module comprises an elastic clamp with one end connecting to the housing and another end having a clamping sheet extending vertically, and a protective protrusion projecting from an inner surface of the clamping sheet to prevent the clamping sheet from contacting a panel of an electronic device having an image lens when the optical device is joined to the electronic device through the elastic clamp, and the viewing device is finely regulated to align the image-capturing lens in a horizontal position, in a vertical position or in an inclined direction.

4. The optical device as claimed in claim 3, wherein the clamping sheet comprises a viewing window corresponding to the window of the housing, and the image formed by the lenses is viewed through the window and the viewing window.

5. The optical device as claimed in claim 1, wherein the light-filling/polarizing regulation module further comprises a control module, the control module comprises a control circuit electrically connected to the light emitting diodes and the polarizers and a touch switch electrically connected to the control circuit and configured to turn on the light emitting diodes and the polarizers, the touch switch is continuously pushed for a period to adjust the brightness of the light emitting diodes.

6. The optical device as claimed in claim 1, further comprising a charging module, wherein the charging module comprises a chargeable battery and a plug of universal serial bus electrically connected to the chargeable battery.

7. An optical device with switchable multiple lenses, configured to be mounted in front of an image-catching lens, comprising:
 a viewing device comprising:
  a housing comprising at least one window; and
  a lens module disposed in the housing and comprising a plurality of lenses,
 wherein an image caught by the image-catching lens is zoomed through correspondence of any one of the lenses to the window;
 a connecting module on which the viewing device is mounted providing finely-adjusted alignment of the lens module with respect to the image-catching lens;
 a light-filling/polarizing regulation module mounted in the housing and providing a light source and fine-tuned illumination;
 a view operating module, wherein the housing comprises two windows, the lenses are of different lens power and movable in the housing, and the view operating module is configured to switch the lenses to correspond to windows so as to zoom the image caught by the image-catching lens;
 wherein the lens module further comprises a lens seat pivoted in the housing, the lens module comprises four lenses having different lens power arranged as a cross shape on the lens seat in such a manner that optical axes of the lenses are substantially perpendicular to a plane of the image-capturing lens, the view operating module rotates the lens seat so that two of the lenses correspond to the windows to obtain a required magnifying power.

8. The optical device as claimed in claim 7, wherein the view operating module comprises a wheel, and the lens module further comprises a lens seat pivoted to the housing so that the optical axis is substantially perpendicular to a plane of the image-catching lens, the lens seat is moved by the view operating module and configured to switch the lenses to correspond to the windows.

9. An optical device with switchable multiple lenses, configured to be mounted in front of an image-catching lens, comprising:
 a viewing device comprising:
  a housing comprising at least one window; and
  a lens module disposed in the housing and comprising a plurality of lenses,
 wherein an image caught by the image-catching lens is zoomed through correspondence of any one of the lenses to the window;
 a connecting module on which the viewing device is mounted providing finely-adjusted alignment of the lens module with respect to the image-catching lens;
 a light-filling/polarizing regulation module mounted in the housing and providing a light source and fine-tuned illumination; and
 a light shield having a window hole, and a sliding portion protruding from the light shield and configured to horizontally mount and slide the light shield on the housing so that the light shield surrounds the window to prevent an external light source influences an image formed by the lenses.

10. The optical device as claimed in claim 9, wherein the light shield and the connecting module are in different sides of the housing.

* * * * *